United States Patent
Derby, Jr. et al.

(10) Patent No.: US 6,169,263 B1
(45) Date of Patent: Jan. 2, 2001

(54) TECHNIQUES FOR ADAPTIVE CONTROL OF FORCE IN RESISTANCE WELDING APPLICATIONS

(75) Inventors: William M. Derby, Jr., Bethlihem, PA (US); Randolph P. Formanek, Danville, IL (US)

(73) Assignee: Automation International Inc., Danville, IL (US)

( * ) Notice: Under 35 U.S.C. 154(b), the term of this patent shall be extended for 0 days.

(21) Appl. No.: 09/366,062

(22) Filed: Aug. 2, 1999

(51) Int. Cl.$^7$ .................................................. B23F 11/02
(52) U.S. Cl. ........................................ 219/86.41; 219/101
(58) Field of Search ............................. 219/97, 100, 101, 219/102, 103, 104, 109, 110, 86.41

(56) References Cited

U.S. PATENT DOCUMENTS

| | | | |
|---|---|---|---|
| 3,542,994 | * 11/1970 | Deffenbaugh et al. | 219/97 |
| 3,681,563 | * 8/1972 | Lifshits et al. | 219/97 |
| 3,790,739 | * 2/1974 | Lifshits et al. | 219/97 |
| 4,296,305 | * 10/1981 | Lifshits et al. | 219/101 |
| 4,408,114 | 10/1983 | Nakata et al. . | |
| 4,634,828 | 1/1987 | Okabe et al. . | |
| 4,725,707 | * 2/1988 | Kuchuk-Yatsenko et al. | 219/100 |
| 5,021,625 | 6/1991 | Destefan et al. . | |
| 5,124,521 | 6/1992 | Boyer et al. . | |
| 5,270,514 | * 12/1993 | Wechselberger et al. | 219/100 |
| 5,367,138 | 11/1994 | Moss et al. . | |
| 5,436,422 | 7/1995 | Nishiwaki et al. . | |
| 5,440,092 | 8/1995 | Kawai . | |
| 5,483,035 | 1/1996 | Kawai et al. . | |
| 5,523,541 | 6/1996 | Ishikawa . | |
| 5,545,872 | 8/1996 | Nakajima et al. . | |
| 5,582,747 | 12/1996 | Sakai et al. . | |
| 5,587,091 | 12/1996 | Kawagoe et al. . | |
| 5,591,355 | 1/1997 | Ishikawa . | |

* cited by examiner

Primary Examiner—Clifford C. Shaw
(74) Attorney, Agent, or Firm—Banner & Witcoff, Ltd.

(57) ABSTRACT

The present invention is an improved butt welding technique that provides adaptive control of force that is applied to a part during a welding process to enable a maintained joint resistance across joint. The force may be adjusted to account for the changing conditions of the part. The present invention may be implemented within any electrical welder having at least one movable platen for carrying a part to be welded, at least one hydraulic cylinder coupled to the movable platen, the hydraulic cylinder having a first chamber and a second chamber, and a servo valve coupled to the hydraulic cylinder. The present invention includes means for making voltage drop measurements across the joint to be welded. The voltage measurements provide feedback as to whether the force should be adjusted. A force control module may be implemented to provide controlled force to the part.

13 Claims, 7 Drawing Sheets

3 PHASE AC-H3,L1   3 PHASE AC-H2,L3   3 PHASE AC-H1,L2

TABLE I

| SEGMENT | OHMS | ~VOLTAGE DROP | CURRENT | ~POWER IN WATTS |
|---|---|---|---|---|
| A | .00000001 | 0.0001992 | 19920 | 4 |
| B | .000001 | 0.01992 | 19920 | 397 |
| C | .0005 | 9.96 | 19920 | 198,403 |
| D | .000001 | 0.01992 | 19920 | 397 |
| E | .00000001 | 0.0001992 | 19920 | 4 |
| TOTAL | .00050202 | 10 | 19920 | 200,000 |

TABLE II

| SEGMENT | OHMS | ~VOLTAGE DROP | CURRENT | ~POWER IN WATTS |
|---|---|---|---|---|
| A | .00000001 | 0.001992 | 192234 | 369 |
| B | .000001 | 0.1992 | 192234 | 38,293 |
| C | .00005 | 9.61 | 192234 | 1,847,695 |
| D | .000001 | 0.1992 | 192234 | 38,293 |
| E | .00000001 | 0.001992 | 192234 | 369 |
| TOTAL | .00005202 | 10 | 192234 | 1,922,340 |

FIG.7

TECHNIQUES FOR ADAPTIVE CONTROL OF FORCE IN RESISTANCE WELDING APPLICATIONS

BACKGROUND OF THE INVENTION

1. Field of the Invention

In general, the present invention relates to welding techniques, and more particularly to techniques for adaptively adjusting the force exerted by a platen on a resistance welding machine to achieve a controlled resistance across the welding interface.

2. Statement of Related Art

Resistance welding machines are well known in the art. In a resistance welding process, two pieces of material are held by clamps so they are touching or are nearly touching. An electric current is then delivered through these pieces. The current heats up the interface or the joint between the two pieces causing the material to become soft. At this point, the machine rapidly brings the two pieces together which forges the weld. Flash welds and butt welds are two common types of resistance welding techniques.

In flash welding applications, particularly where parts having large cross sections are to be flash welded, it is desirable to preheat the parts prior to flashing in order to minimize the amount of material consumed in the flash and to decrease welding time. Preheating is generally performed by forcing the two pieces together for some time and then separating them. When the pieces are in contact, the electrical current will cause the pieces to heat according to the joint resistance or the resistance at the interface between the two parts. By holding the two pieces together at a controlled force, the joint resistance between the parts can be made more consistent, which allows for the heat produced in the pieces to be precisely controlled.

In butt welding applications, it is also desirable to control the force with which the parts are held together. The butt weld requires that the two parts be in solid contact with each other. When current is delivered through the parts, the interface between the parts heats up due to the joint resistance at the interface between the parts. The heat thereby allows the parts to be forged or upset together. By forging to a specific force instead of a distance, the weld will forge to the correct distance according to the amount of heat that is in the part. By precisely controlling the joint resistance we can control the heat introduced into the part and thereby provide a consistent upset distance.

Figure 6:
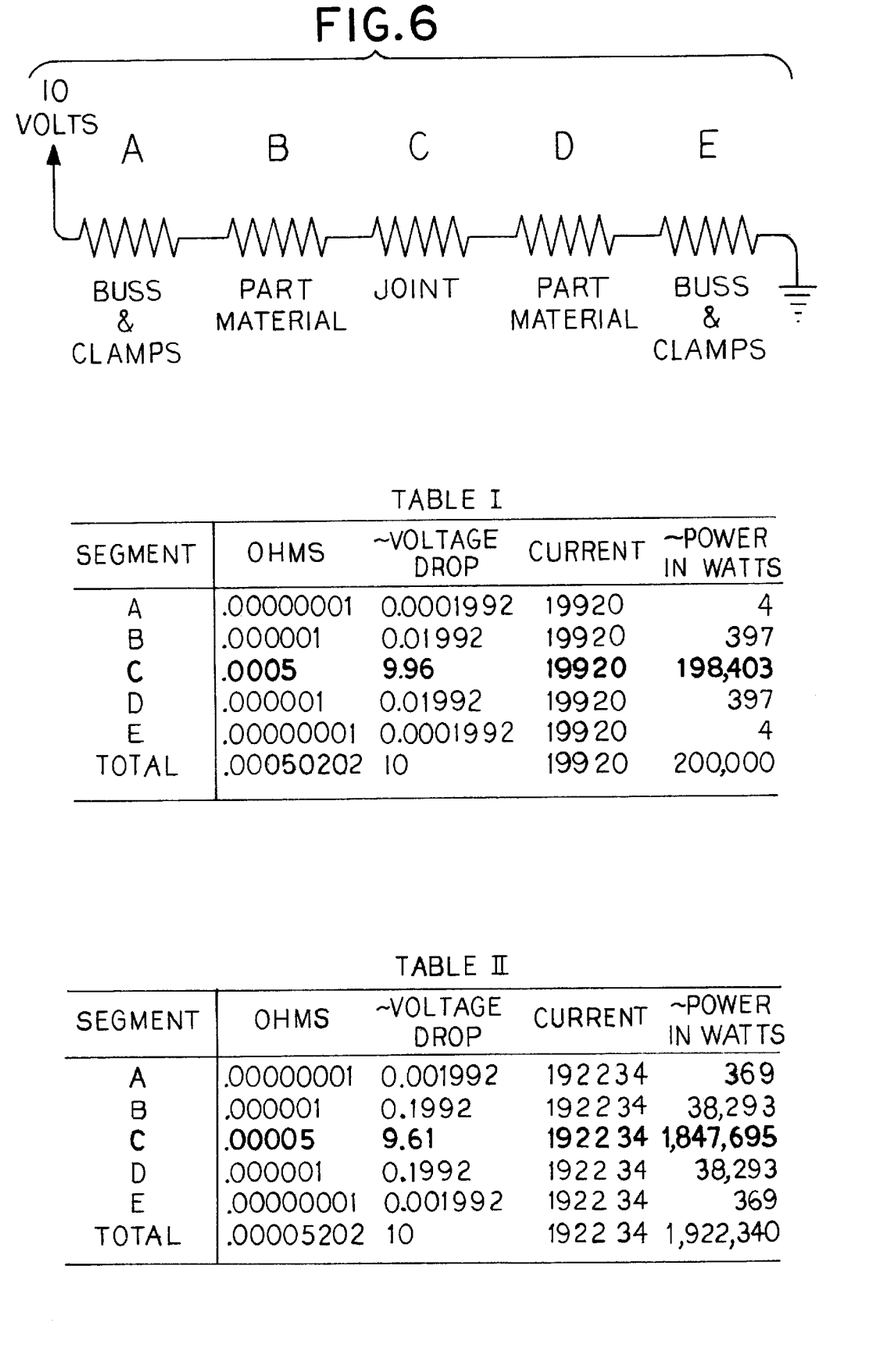
FIG. 6 shows a schematic diagram of a welding part showing the various resistances that are present and two tables illustrating the effect a change in the joint resistance has in the total power that is dissipated at the joint.

In either flash weld preheating or butt welding, it is important to the welding process to control the joint resistance or the resistance at the interface of the part. The higher the joint resistance, the less energy that is dissipated at the joint, thereby slowing the rate at which the joint is heated. As shown in FIG. 6, a small decrease in joint resistance (Segment C) results in an exponential increase in power dissipation at the joint. The joint resistance is generally controlled by the force with which on the part to be welded are held together. A greater force generally reduces joint resistance. Since thermodynamic forces tend to equalize the heat across the part, it is desirable that the weld be made quickly while the heat is still concentrated at the interface. Accordingly, a lower joint resistance causes greater power to be passed through the part, thereby resulting in faster heating.

A lower joint resistance, however, produces significant heating throughout the part itself which undermines the desire to localize the heat effect. Further, achieving a lower joint resistance requires a greater force which may deform the part to be welded. A lower joint resistance may also overheat the part. If the parts overheat, they will become softer and deform or melt. This will preventing proper forging, and result in parts having to be scrapped.

A higher joint resistance avoids some of these problems, however, it increases the heating time for the interface. An increased heating time, allows thermodynamic forces to equalize the heat across the part. A high joint resistance also introduces the risk of a flashing where material from the joint is ejected in the form of sparks. Flashing unevenly removes heat and material from the joint, thereby reducing its quality, or even preventing proper forging. In most cases, flashing will result in the part having to be scrapped. To avoid these undesirable results, welding equipment incorporate various techniques to achieve rapid heating of the interface while ensuring that the interface does not overheat. Welding equipment therefore typically incorporate a method for controlling the force between the pieces. For example, a constant force may be supplied to the part as it is being welded. The welding machine typically utilizes a servo valve that controls the movement of one of the parts being welded. The servo valve also supplies a force so that the parts may be welded. By maintaining a constant force as applied by the servo valve; the two pieces are maintained in contact with each other thereby reducing the risk of overheating of the parts at the interface.

However, such known techniques are of limited value since the constant force technique does not always ensure against overheating. Further, the welding operator must by trial and error determine the best approximate servo valve force that will adequately avoid the risk of overheating. This technique generally requires much experimentation and prior knowledge to produce a good weld. Further, the control of force of the servo valve is subject to great deviation in the resulting force on the parts, due in large part to the frictional forces on the platens, platen mass and inertia. Since the current practice relies on absolute force parameters, the effects of these forces must be compensated or reduced. This requires more expensive, low mass, low friction machinery and/or the need for sophisticated control algorithms to compensate for these forces. Another problem with providing a constant force is that the system is incapable of adjusting the force in response to the changing conditions of the parts being welded. For example, in the case where a flash weld is about to occur, the present system is incapable of adjusting the force applied by the servo valve. Accordingly, even with control of force, there remains substantial risk of overheating and poorer quality welds.

It is therefore an object of the present invention to provide an improved welding technique for adaptively controlling the force applied to the part being welded.

It is another object of the invention to provide an improved welding technique to maintain a desired joint resistance during a welding cycle.

It is yet another object of the invention to provide an improved welding technique to maintain a desired voltage drop across the joint to be welded during a welding cycle.

SUMMARY OF THE INVENTION

The present invention is an improved butt welding technique that provides real-time control of the servo valve to account for the changing conditions of the parts being welded. The present invention may be implemented within any electrical welder having at least one movable platen for carrying a part to be welded, at least one hydraulic cylinder coupled to the movable platen, the hydraulic cylinder having a first chamber and a second chamber, and a servo valve coupled to the hydraulic cylinder. In one embodiment, the present invention includes means for measuring the voltage differential across the joint. Based on this information, the present invention may adaptively adjust the target force of the weld to maintain a constant voltage drop across the joint. The present invention may include force controller having one or more pressure transducers coupled to the servo valve and a proportional/integral (PI) controller to accurately deliver the desired force on the platen.

These as well as other novel advantages, details, embodiments, features and objects of the present invention will be apparent to those skilled in the art from following the detailed description of the invention, the attached claims and accompanying drawings, listed hereinbelow, which are useful in explaining the invention.

BRIEF DESCRIPTION OF THE DRAWINGS

In the text which follows and in the drawings, wherein similar reference numerals denote similar elements throughout the several views thereof, the present invention is explained with reference to illustrative embodiments, in which.

DETAILED DESCRIPTION OF THE INVENTION

For a better understanding of the present invention, reference may be had to the following detailed description taken in conjunction with the appended claims and accompanying drawings.

Figure 1:
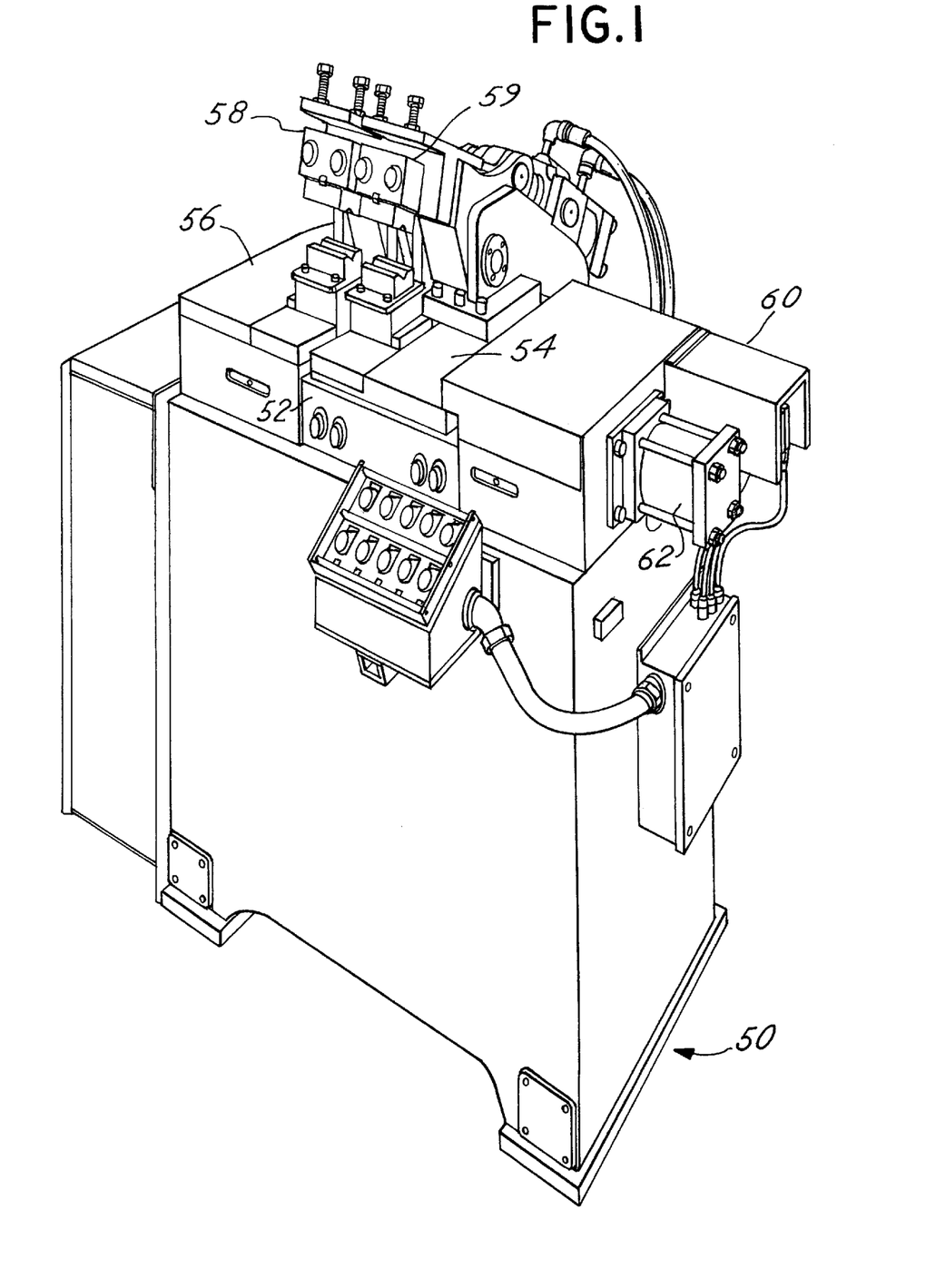
FIG. 1 depicts a conventional welder suitable for use with the present invention.
Figure 2:
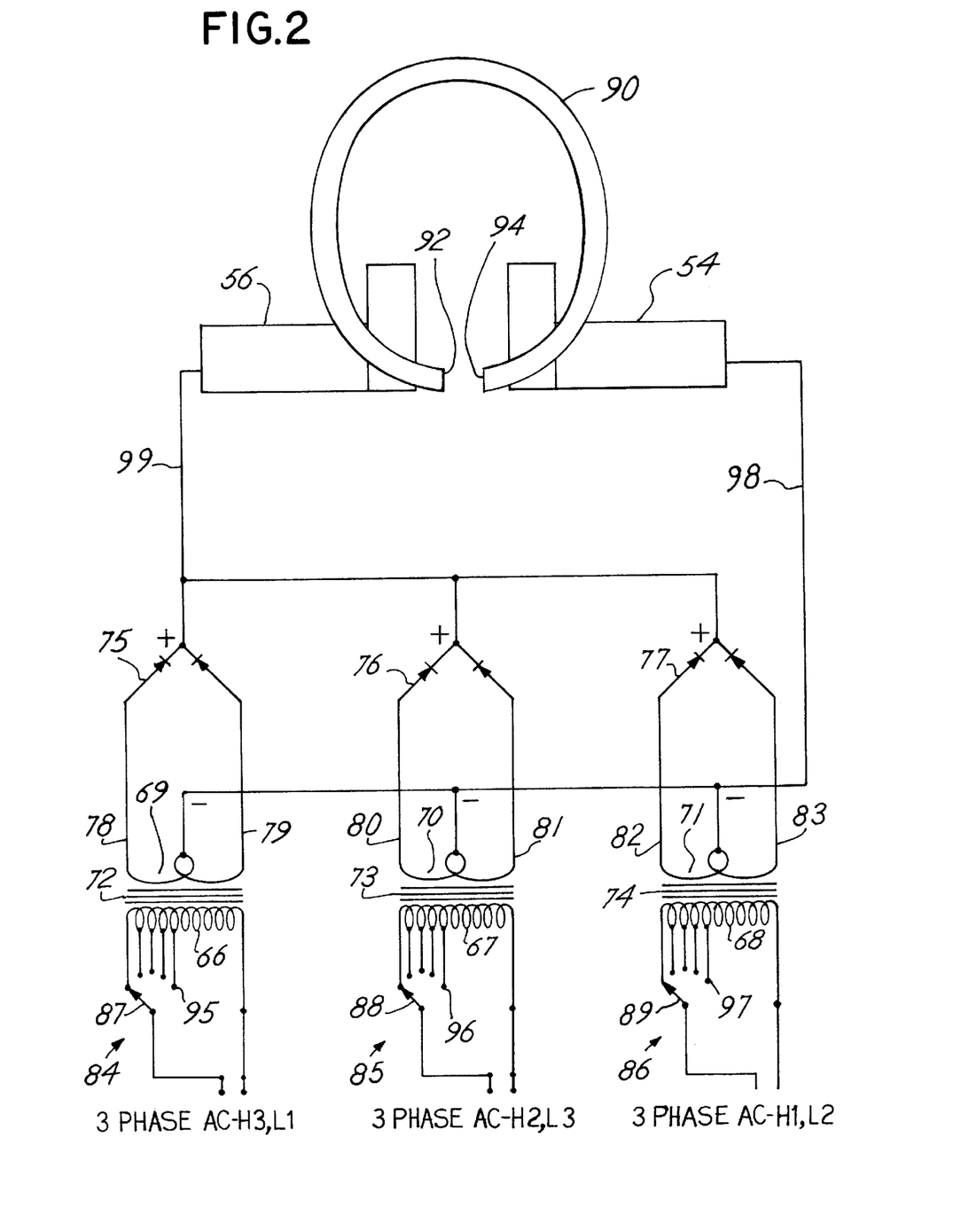
FIG. 2 illustrates an exemplary part to be welded as mounted in a conventional platen along with an example 3-Phase DC power system.

The present invention may be incorporated within any conventional or future developed welder. For example, FIG. 1 depicts a conventional AC welder 50 suitable for use with the present invention. Welder 50 comprises a side bar 52, as well as a movable platen 54 and a stationary platen 56 that carry clamps 58 and 59 for holding a part to be welded. Movable and stationary platens 54 and 56 are electronically isolated and are coupled to a power supply. Welder 50 also includes a platen position sensor 60 and a hydraulic cylinder 62. Referring to FIG. 2, welder 50 includes a three Phase DC Power Supply 64 that has three identical transformers consisting of primary windings 66, 67, 68 and secondary windings 69, 70, 71 that are magnetically coupled by cores 72, 73, 74. Leads 78, 80, 82 and 79, 81, 83 electrically connect secondary winding 69, 70, 71 with rectifiers 75, 76, 77 which convert the AC voltages to DC. Those experienced in the art will recognize that the configuration of rectifiers 75, 76, 77 may vary. Leads 98 and 99 electrically connect rectifiers 75, 76, 77 to platens 54 and 56, respectively. Power Supply 64 also includes a three tap assemblies 84, 85, 86 having a switches 87, 88, 89 that conduct voltage from the three phase AC source to various tap conductors 95, 96, 97 connected to primary winding 66, 67, 68.

Platens 54 and 56 are adapted to hold a weld part 90 having ends 92 and 94. The weld part may form a ring which conducts current, thereby imposing an electrical load on secondary windings 69, 70, 71.

Figure 3:
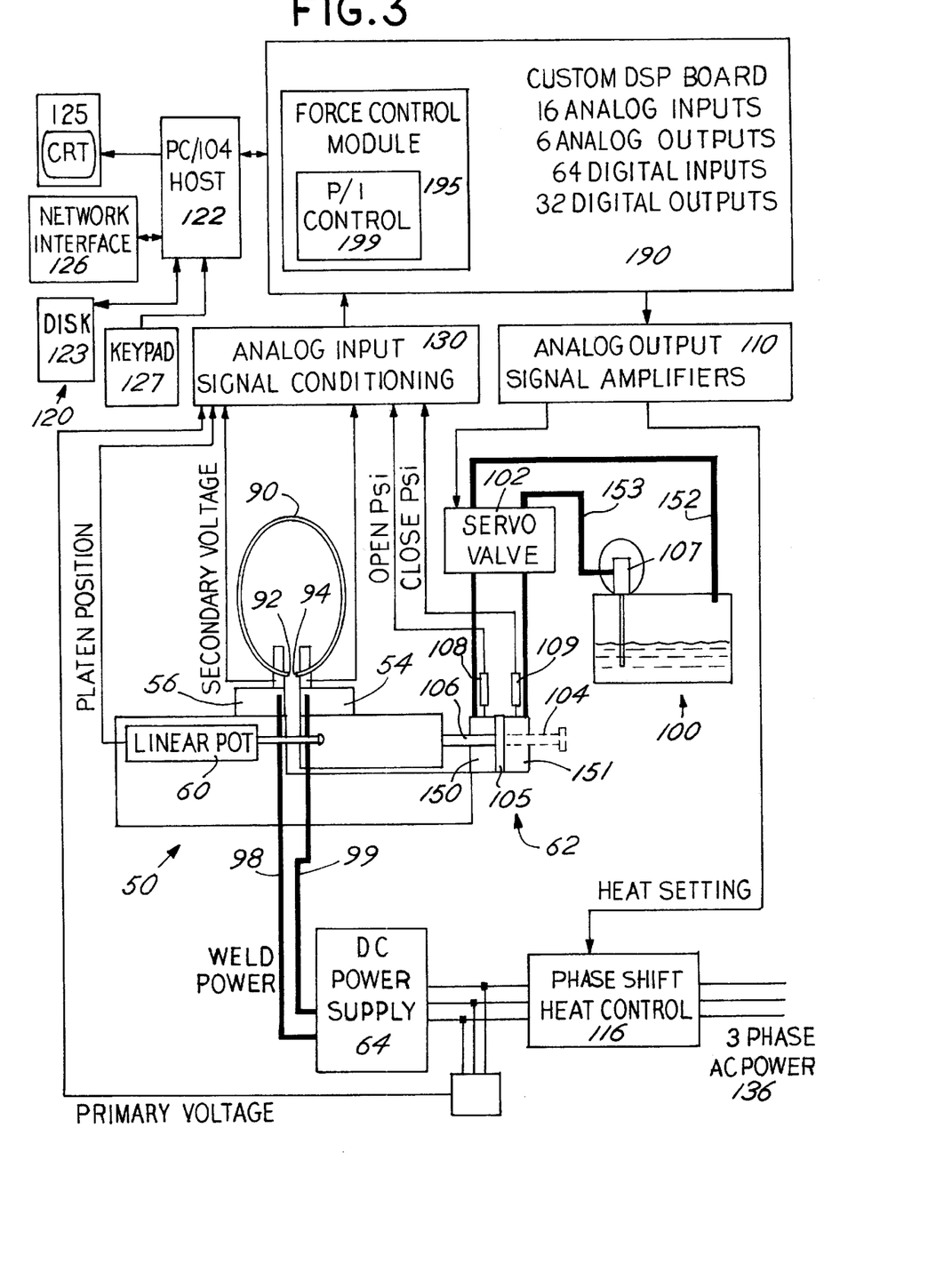
FIG. 3 is a schematic drawing of the electrical components of a welding machine made in accordance with a preferred embodiment of the present invention.
Figure 7:
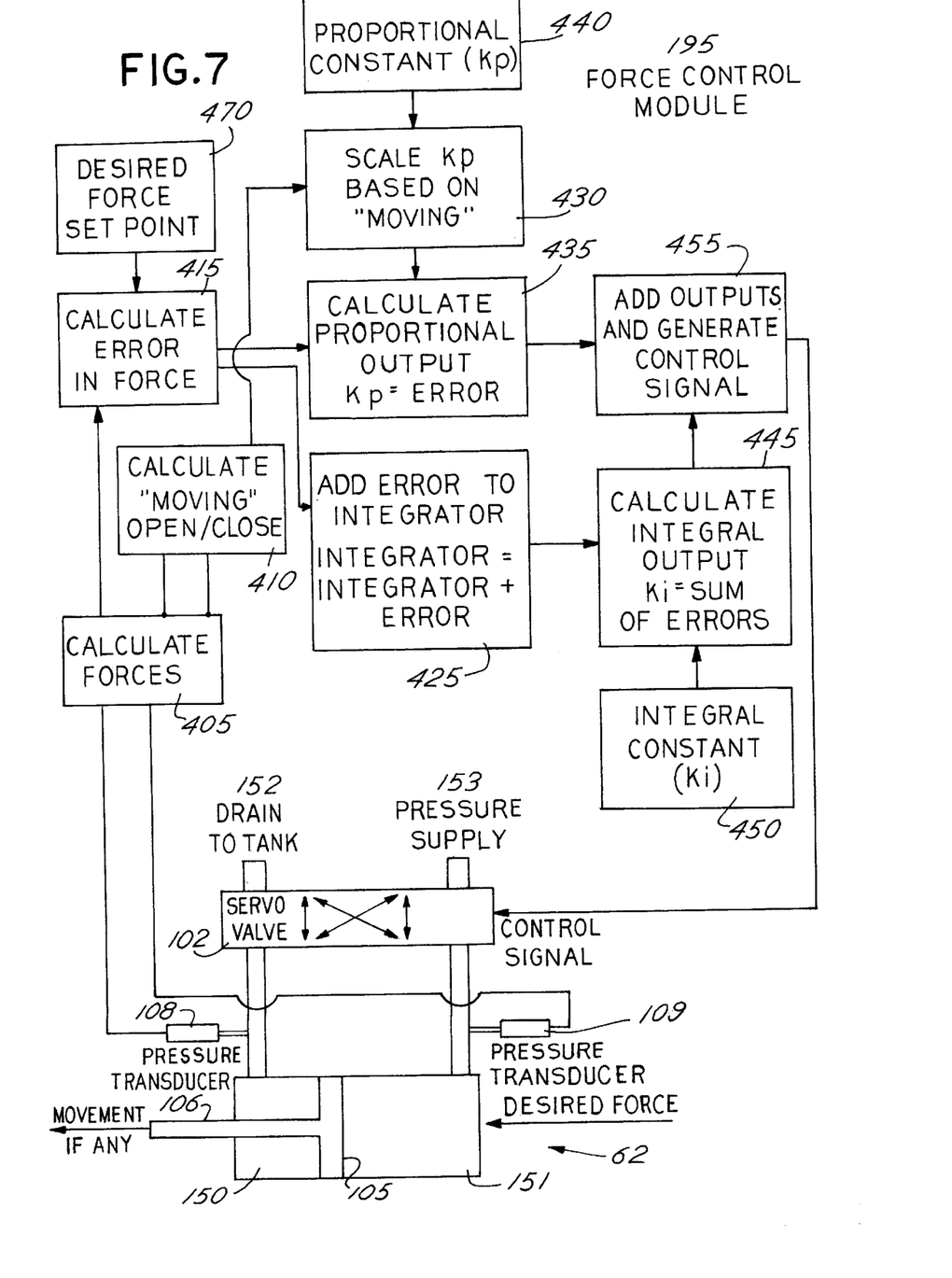
FIG. 7 illustrates a force control mechanism as used in accordance with a preferred embodiment of the present invention.

FIG. 3 is a schematic drawing of the electrical components of a welding machine made in accordance with a preferred embodiment of the present invention. Although not required, the present invention is preferably implemented within a welding system similar to that disclosed in U.S. Pat. No. 5,367,138 entitled "Welding Assurance Control Techniques" and assigned to Automation International, Inc. (hereinafter referred to as "the 138 patent"), which is incorporated herein by reference in its entirety. Those skilled in the art will appreciate that the present invention may be implemented within any number of welding systems. As preferred, a high speed computer system 190 is connected to welder 50 and executes the necessary algorithms discussed herein for adaptive control of force. Computer 190 is preferably a custom designed machine based on a digital signal processor and possessing high speed synchronous analog inputs, analog outputs and discrete I/0. As illustrated in FIG. 3, computer 190 monitors various items on welder 50 using transducers and provides control outputs to welder 50. Computer 190 preferably includes a Digital Signal Processor (DSP) system containing an analog output system having signal amplifiers 110 to produce the required drive voltages. DSP system also may also control a phase shift heat control 116 that controls the power conducted to the DC Power supply 64 from AC power lines 136. DSP system may optionally contain a force control module 195 which may be a stable, high-speed force controller. As preferred, this functionality is carried out by software in computer 190 and is effected by modification of a servo valve 102 as disclosed in U.S. Provisional Application Ser. No. 60/105,907 filed on Oct. 28, 1998, which is incorporated herein in its entirety, and which is schematically depicted in FIG. 7. Any other force control technique may also be used.

DSP system of computer 190 also contains an analog input system which includes various input signal conditioning circuits 130 that monitor various characteristics of welder 50. Input signal conditioning circuits 130 may include those disclosed in the '138 patent. In accordance with a preferred embodiment of the present invention, input signal conditioning circuits 130 monitor the Primary and Secondary Voltages. Input signal conditioning circuits 130 may also monitor, for example, the position of movable platen 54, the voltage across the stationary platen 56 and movable platen 54, and/or the hydraulic pressure within first and second chambers 150 and 151 via first and second transducers 108 and 109. For example, in the case of monitoring platen position, a linear potentiometer 60 is mechanically connected to movable platen 54. Potentiometer 60 varies its resistance in response to movement of platen 54, thereby providing a position-indicating signal to a platen position.

DSP system 190 of computer 190 may be coupled to a user interface computer 120 which to provides setup information for the weld and enables the machine operator to view signals being monitored by the custom DSP 190. Interface computer 120 preferably comprises an PC/104 compatible microprocessor with a large hard disk 123 for the storage of data. A conventional monitor 125 coupled to computer 122 provides a means of communicating messages to an operator. The operator can respond to the messages via a keypad 127 coupled to computer 122. Interface computer 122 may also include a network interface 126.

DSP system 190 of computer 190 preferably has 16 channels of analog inputs which are simultaneously sampled, 6 channels of analog outputs, 64 channels of discreet inputs and 32 channels of discreet outputs. The general operation of the welding system of FIG. 3 is discussed in further detail in the '138 patent which is incorporated herein by reference.

Referring still to FIG. 3, the machine for which the present invention generally applies consists of a stationary platen 56 and a movable platen 54 having dies which hold the part(s) 92 and 94 to be welded. The movable and stationary dies 54 and 56 are electrically isolated and connected to welding power supply 64. As illustrated herein, power supply 64 is a DC supply, but may alternatively be a signal phase AC supply. The movement of platen 54 is controlled by a hydraulic assembly 100 having a servo valve 102 that admits hydraulic fluid to a cylinder 62. Servo valve 102 is preferably a high-speed bi-directional servo valve. Servo valve 102 is provided by relatively constant supply of oil by a pump 107 and optionally an accumulator system (not shown). Cylinder 62 has a first chamber 150 and a second chamber 151 that is separated by a piston 105. Piston 105 inside cylinder 62 moves a rod 106 that is mechanically coupled to platen 54. Hydraulic fluid is supplied to servo valve 102 by pump 107. Pump 107 provides a constant force to servo valve 102.

Advantageously, the present invention provides control of joint resistance to provide an increased quality of a weld. A desired heat gradient in the weld part may be achieved by maintaining a stable joint resistance. Joint resistance is often controlled by controlling the force with which the joint is held together. As the force increases, the joint resistance decreases to the resistance of the part itself. Stable force, however, will lead to unstable heating due to current rise as the part heats. If left unchecked, a stable force will eventually result in hunks of molten material being ejected from the joint, like a thick flash. Further, as the joint is heated, the material becomes softer, thereby smoothing out the join interface and providing more contact. This lowers the joint resistance and if left unchecked allows increased current flow which further accelerates the heating process. Also, since the joint edge is moving (expanding away from the plane of the joint) the joint force will tend to fall off if not maintained. Accordingly, it is desirable to adaptively control the joint force in such a way as to maintain a steady resistance at the joint. The force controller is capable of increasing or decreasing the target force to account for the changing conditions of the part and to ultimately maintain a steady joint resistance.

As illustrated herein, the present invention is implemented for adaptively controlling the force during a DC butt weld. It is desirable to maintain a constant voltage drop across the joint by modifying the target force to account for the changing conditions of the part. The constant voltage drop across the joint corresponds directly to joint resistance of the part and, unlike a current based approach, provides timely feedback of the joint resistance. Though a current based approach may be implemented in accordance with the present invention, its feedback of the joint resistance may not be as timely since the current has a phase shift of 90 degrees from the voltage.

Figure 4:
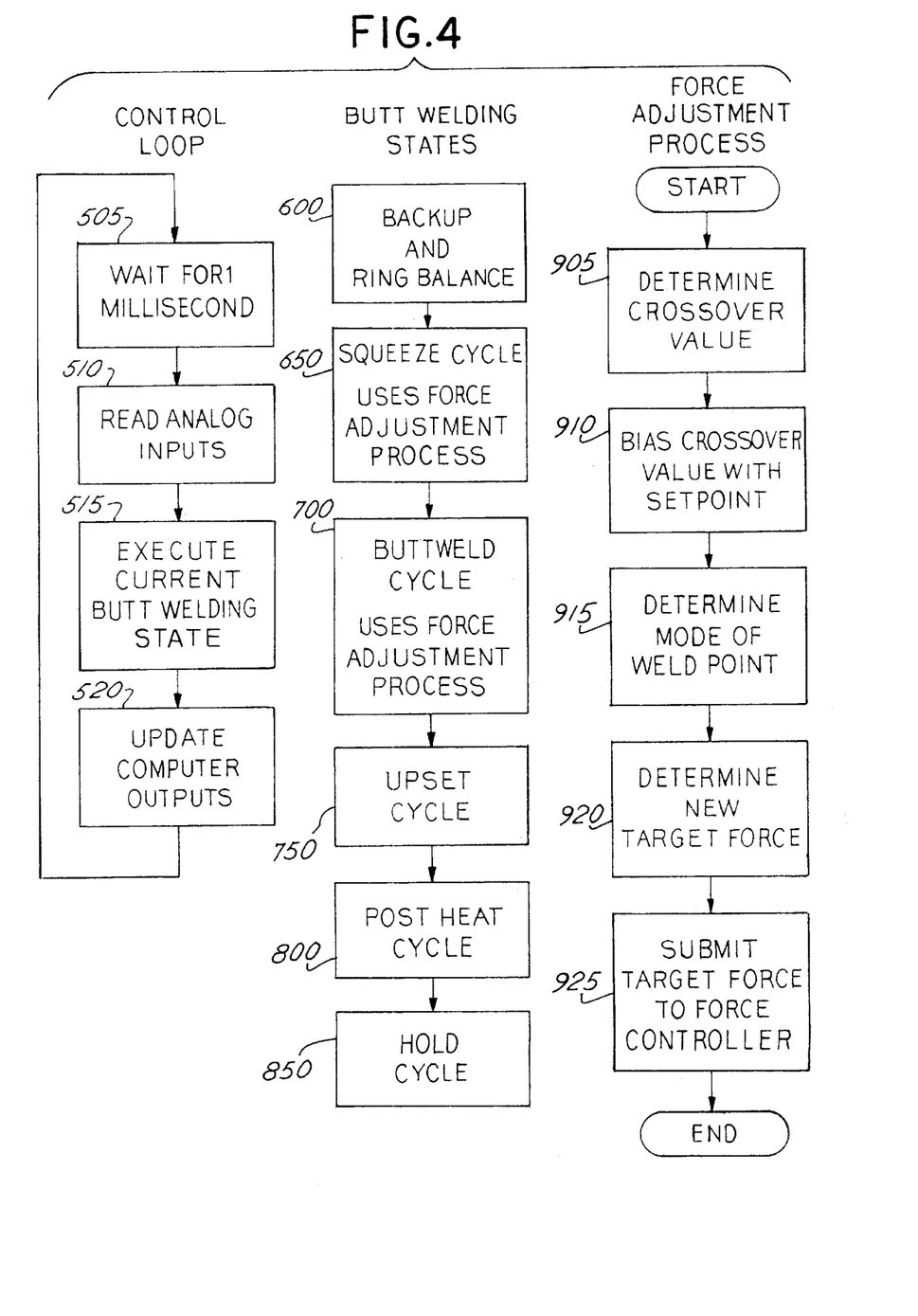
FIG. 4 is a flow chart depicting the welding cycles and force adjustment process in accordance with the present invention.

The present invention is implemented preferably in software on the hardware described above. The present invention preferably implements a welding state machine as described in '138 patent which allows it to support an arbitrary sequence of welding cycles. The welding cycles are implemented as individual state machines as shown in FIG. 4 and contain the code to perform the desired operation as well as the sequence of internal state transitions. The welding state machine is preferably executed every millisecond though any other frequency may be implemented (frequency is limited by hardware limitations, it is also potentially limited by the force control response time).

As shown in the flow chart of FIG. 4, the following steps are performed during a butt weld. The part to be welded is often in the form of a single part being welded together (i.e. a hoop or ring). Any welding current that is delivered to through the part will pass through the joint but also through the hoop or ring. Accordingly, a shunt voltage must first be determined. First, at state 600, a Backup cycle moves platen backward to introduce a gap between the joint. This allows the system to measure the shunt voltage across the part to be welded. The distance to move is specified in the factory calibration database. The measured value for the existing load across the dies is the ring balance. The ring balance represents the load around the dies and will be used to remove it's effect in the crossover calculation. To measure the shunt effect, the weld power is turned on for a period of time and the ring balance (DC only) is calculated by the following formula:

*Ring Balance=average primary voltage/(average secondary voltage * turns ratio)*

The turns ratio is dependent on the transformer design and the tap setting selected (see FIG. 2). The average voltage is measured over a period of 40 milliseconds, though the period of calibration may be for a longer or shorter period. When these actions are completed the welder state machine changes to the squeeze cycle 650. Squeeze cycle is used to re-close the gap and apply an initial pressure across the joint. This is done before weld power is turned on to avoid an initial flashing in the butt weld. The force controller (discussed herein) is used to bring the pieces together to a force which corresponds to a low initial resistance.

The squeeze force may be adjusted by the operator from the weld schedule. Once the target force has been achieved, the welder state machine changes to the Butt Welding cycle. At state 700, the Butt Welding cycle performs the heating actions of the weld using an adaptive force algorithm. The initial state of the butt welding cycle activates the weld power and sets the phase shift heat output (of phase shift heat control module 116 of FIG. 3) to appropriate value from the weld schedule. Further, initial force target is inherited from the squeeze force. During the remainder of the Butt Welding cycle, the following Force Adjustment Process is executed.

Figure 5:
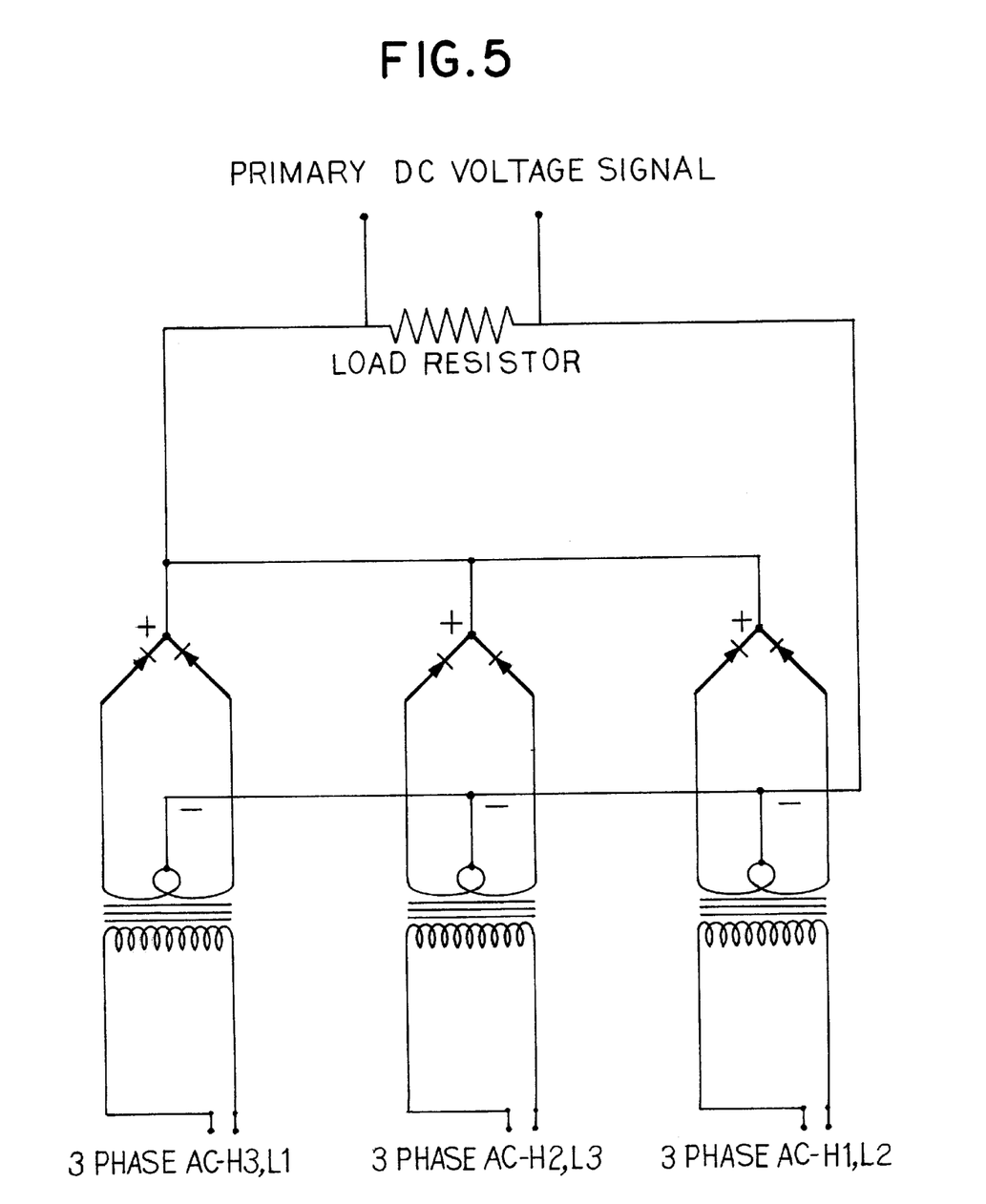
FIG. 5 is a schematic diagram of the circuitry configuration for determining the Primary DC voltage.

At step 905, a crossover value is derived and represents a ratio of the actual voltage drop across the joint relative to the targeted voltage drop for achieving the desired joint resistance. The crossover value factors in any existing loads from the machine (for example, in the case of a hoop or ring part, a load is the shunt voltage). The effect of these loads, such as the shunt voltage, are nulled when calculating the crossover voltage. The crossover value may be derived using the following information: (1) the Supply or Primary voltage; (2) the Secondary Voltage (voltage across the joint); (3) the Transformer Turns Ratio; (4) the Nominal Supply Voltage; and (5) the Ring Balance. The Primary DC voltage is read by attaching three step-down transformers, rectifiers and a nominal load to the incoming 3-phase power lines as shown in FIG. 5. The step-down transformer ratio and load are based on the input voltage requirements of the control system. If there is any phase shift heat control present, the primary measurement should occur after it's effects are produced. The Secondary Voltage is read by attaching wires to the dies at a point as close as possible to the point of clamp/part contact. This measured voltage may in turn be scaled for the input needs of the system. The transformer turns ratio is a constant which the control needs to be given. These values are stored in a database and are selected based on a chosen weld schedule. The schedule specifies what tap is to be used. The turns ratios for the various taps can then be established by the calibration database. The nominal supply voltage is the maximum expected supply voltage for the machine. This number allows differing machines to share schedules if parameters are given in terms of percentages. The Ring Balance is a measured value for the existing load across the dies and is calculated in welding state 600 (as discussed above).

The crossover value is calculated by first generating an adjusted secondary voltage (AdjustSec):

$$AdjustSec = Sec * Bal * Turns$$

where Sec=Secondary Voltage; Bal=Ring Balance; and Turns=Transformer Turns Ratio. If there is no load across the dies, this value should be equal to the primary voltage.

Next, the difference between the adjusted secondary voltage and the primary voltage is calculated:

$$Difference = AdjustSec - Pri$$

where Pri=Primary Voltage.

Finally, the voltage difference is converted to a percentage of the Nominal Supply Voltage and converted to a +/−100 range:

$$Crossover = (Difference/Nominal) * 100.0$$

where Nominal=Nominal Supply Voltage which is the maximum expected voltage seen by the machine and is typically 440 to 580 volts.

The crossover value will be a number which generally ranges from 0 (meaning no contact of the parts at the joint and maximum resistance) to −100 (meaning full contact at the joint and no resistance). The number may also be positive if the joint contact is momentarily broken causing the magnetic field generated by the current to collapse thereby creating a voltage spike. A positive crossover value will result, for example, during flashing.

Referring back to FIG. 4, at step 910, the crossover value is then biased with the desired "target" value. The target value comes from the weld schedule and is preferably a crossover value that is desired. Note that the target is the positive value of the desired crossover. The resulting value, called the Weld Point, is the error between the desired (target) and actual crossover values. The Weld Point is positive when the crossover value is too low and negative when the crossover value is too high.

$$Weld\ Point = Crossover + Target$$

At step 915, the mode of the points is generated using a history of the last N weld points. This step may be unnecessary if there was no ripple on the DC supply voltage and there was no lag in the force controller. The weld point often varies over time; the DC power supply graphed over time produces a "fuzzy" line with a width 2–3% due to the ripple. It is therefore desirable to target the center of this fuzzy range.

One preferred way to achieve this target is to look at the last N points and find the Min and Max of the Weld points over the period. As preferred, the sampling rate is 1 millisecond which leads to an N value of 6. This ensures that the sampling window is larger than the ripple in the DC power. The center of the fuzzy zone may then be estimated by then taking the middle (or Mode) of this range. The center of the Weld Points is called the Range Point which represents the percentage of error in the measured crossover value.

At step 920, a new target force is generated by adding a scaled version of the Range Point to the old target force. The old target force is multiplied by a value which represents the amount the force should change per percent error in the crossover value. This value is dependent on characteristics of the force controller used. Optionally, this value may depend upon on the crossover value itself. For example, it may be desirable to have different values depending upon whether the crossover value is low or high. As preferred, the value is 0.003 tons/% error for positive Range points and 0.0005 tons/% error for negative Range points. Advantageously, the force will ramp up quickly when the crossover value is below the target force (thus preventing the part from going into a flash) but will approach the target force more slowly when the crossover value is above the target (thus causing it to reduce the target force slowly).

The appropriate values may be determined empirically from the performance of the force controller. Larger ramp values will cause ringing of the crossover value around the target force. Smaller values do not respond as quickly to abrupt changes in resistance, causing the control to lag behind. As preferred, the ramp values are stored in a database and may be customized on a machine by machine basis. Also, a data acquisition system is preferably implemented to allow the operator to inspect of all the variables over time. The operator may thereby try various values and measure response time changes to achieve an optimal value.

At step 925, the new target force is submitted to the force controller. As preferred, the force controller is implemented in software as described in U.S. Provisional Application Ser. No. 60/105,907 filed on Oct. 28, 1998. Alternatively, the system may generate an analog output whose voltage is proportional to the desired target force and submit the analog output to an external force controller.

The Butt welding state 700, will transfer to the Upset state 750, for example, if the velocity of platen travel has reached the desired value. Alternatively, it may also transfer to Upset state 750 if the platen has traveled a given distance. As preferred, the operator may select which parameters will end the Butt Weld cycle.

The Upset welding state 750 turns on the servo valve or other valves to provide a large rush of force. Alternatively, the force controller may be used to provide a controlled upset force. During the upset process, the weld power is preferably controlled. The Upset weld state ends when a desired distance has been achieved. Alternatively, it may also end if a given force has been achieved.

Once the Upset state is complete, Optionally, welding state 800, post heat, may be used to provide a controlled re-heating of the part. This is useful in some materials to change the characteristics of the metal in and around the weld joint.

Also optionally, at welding state 850, a post-weld holding cycle may be implemented to allow the part to cool before it is unclamped from the machine. The duration-of this time may be set in the weld schedule.

Advantageously, the present invention provides a technique to adaptively adjust the target force on a resistance welder to achieve a controlled resistance across the weld. As the part heats up, the force control follows the metal until it is collapsing at a desired rate for upset. Weld consistency is improved since the target force is based on feedback from the part (i.e., joint resistance or voltage drop) rather than some arbitrary time. The adaptive technique will produce a consistent, controlled heat gradient in the part based on a single setting and so should be both easier and quicker to set up.

Further, the problems of platen friction and inertia are eliminated since these forces will appear as changes in the joint resistance and the force will be changed as necessary. The ability to overcome dynamic changes in joint resistance are based on the speed of the force controller to make stable changes to the target force.

Even further, the present invention reduces the necessity to accurately establish an initial target force. Since the target force is constantly modified to the parts needs (by making relative adjustments based on what the joint is doing), the present invention establishes the "correct" force even if the absolute measurement is off. The "force" measurement is in most cases based on the pressure differential in the driving cylinder(s). Further, the present invention may advantageously be implemented using standard off-the-shelf parts that are easy to attach and relatively cheap.

The present invention is illustrated in the context of a DC butt weld cycle. Those skilled in the art will appreciate that present invention may also be implemented in other weld cycles such as AC butt welding as well as standard flash-butt and other resistance welding applications.

In the foregoing specification, the present invention has been described with reference to specific exemplary embodiments thereof. Although the invention has been described in terms of a preferred embodiment, those skilled in the art will recognize that various modifications, embodiments or variations of the invention can be practiced within the spirit and scope of the invention as set forth in the appended claims. All such modifications, embodiments or variations of the invention are considered within the sphere, spirit, and scope of the invention. The specification and drawings are, therefore, to be regarded in an illustrated rather than restrictive sense. Accordingly, it is not intended that the invention be limited except as may be necessary in view of the appended claims.

What is claimed is:

1. In an electrical butt welder having a movable platen for carrying a part to be welded, the part having a joint where the weld is to occur, a method of adaptively controlling a force applied on the part:
   a. applying a force to the part;
   b. providing electrical power through the joint to heat the part at the joint;
   c. taking at least one voltage drop measurement across the joint;
   d. analyzing the voltage drop measurement to determine whether the voltage drop is within a desired range; and
   e. if the voltage drop measurement is outside the desired range, adjusting the force applied on the part to achieve a voltage drop measurement that is within the desired range,
   wherein the force applied to the part is adaptively adjusted to maintain a steady resistance across the joint.

2. The method of claim 1, further comprising the step of determining a new target force to be applied to the part.

3. The method of claim 1, wherein the step of analyzing includes the step of establishing an error value and wherein the step of adjusting the force adjusts the force in proportion to the error value.

4. The method of claim 1, fierier comprising the step of measuring a shunt voltage.

5. The method of claim 1, further comprising the step of performing a squeeze cycle.

6. The method of claim 1, flier comprising the step of performing a post heat cycle.

7. The method of claim 1, further comprising the step of performing a holding cycle.

8. In an electrical butt welder having a movable platen for carrying a part to be welded, the part having a joint where the weld is to occur, an apparatus for adaptively controlling a force applied on the part:
   a. a force controller providing a force to the joint by way of a servo valve;
   b. at least one sensor for measuring a voltage drop across the joint;
   c. a processor responsive to the sensor to determine an error in the voltage drop to the desired voltage drop; and
   d. an output device from said processor to provide control information to the force controller for adjusting the force applied by the servo valve on the part in response to the error determination,
   wherein the force applied to the part is adaptively adjusted to maintain a steady resistance across the joint.

9. The apparatus of claim 8, further comprising a force control module responsive to the control information and providing control to the servo valve to achieve a desired force.

10. The apparatus of claim 9, wherein the force control module further comprises a proportional/integral controller.

11. The apparatus of claim 8, further comprising a primary voltage sensor.

12. The apparatus of claim 8, wherein the processor is part of a computer and the computer has an input conditioning circuit to receive information from the sensor.

13. The apparatus of claim 8, wherein the processor is part of a computer and the computer has an output signal amplifier to provide output information to the servo valve.

* * * * *